United States Patent
Orton et al.

(10) Patent No.: US 9,610,830 B2
(45) Date of Patent: Apr. 4, 2017

(54) AUTOMATIC DOOR OPENER FOR DELIVERY TRUCKS

(71) Applicant: Lift Tech Holdings, LLC, Sandy, UT (US)

(72) Inventors: Josh Orton, Spanish Fork, UT (US); Michael France, Lehi, UT (US)

(73) Assignee: LIFT TECH HOLDINGS, LLC, Sandy, UT (US)

( * ) Notice: Subject to any disclaimer, the term of this patent is extended or adjusted under 35 U.S.C. 154(b) by 0 days.

(21) Appl. No.: 14/730,093

(22) Filed: Jun. 3, 2015

(65) Prior Publication Data

US 2015/0266360 A1    Sep. 24, 2015

Related U.S. Application Data

(63) Continuation of application No. 14/199,854, filed on Mar. 6, 2014, now Pat. No. 9,080,367.

(Continued)

(51) Int. Cl.

| | |
|---|---|
| *B60J 5/00* | (2006.01) |
| *B60J 5/10* | (2006.01) |
| *E05F 15/684* | (2015.01) |
| *E05F 15/70* | (2015.01) |
| *E05F 15/676* | (2015.01) |
| *E05F 15/77* | (2015.01) |

(Continued)

(52) U.S. Cl.
CPC ............ *B60J 5/108* (2013.01); *B60J 5/12* (2013.01); *E05F 15/676* (2015.01); *E05F 15/684* (2015.01); *E05F 15/70* (2015.01); *E05F 15/77* (2015.01); *E05Y 2400/32* (2013.01); *E05Y 2600/626* (2013.01); *E05Y 2900/106* (2013.01); *E05Y 2900/516* (2013.01); *E05Y 2900/532* (2013.01)

(58) Field of Classification Search
CPC ............. B60J 5/108; B60J 5/12; B60J 5/14
USPC ...... 296/50, 18.4, 186.4; 160/188, 189, 201, 160/214
See application file for complete search history.

(56) References Cited

U.S. PATENT DOCUMENTS

| | | |
|---|---|---|
| 2,378,262 A | 6/1945 | Vallen |
| 3,443,339 A | 5/1969 | Goldstein |

(Continued)

FOREIGN PATENT DOCUMENTS

WO    WO2009/079685    * 7/2009

*Primary Examiner* — Dennis H Pedder
(74) *Attorney, Agent, or Firm* — Pate Peterson PLLC; Brett Peterson

(57) ABSTRACT

An automatic door opener for delivery trucks may include a door opener motor, clutch, and transmission which are connected to a door opener rail. The automatic door opener is attached to the roof of a delivery truck cargo bay and the door opener motor is operable to open and close a cargo door. The clutch and motor are controlled by a motor control computer which may be programmed to automatically operate the clutch, close the cargo bay door, and disengage the clutch as desired. A rail carriage may be connected to the cargo bay door by a door connector arm which includes a quick release connection to the carriage and which may be operated from the outside of the cargo bay door. A sensor may be connected to the door opener rail and to the motor control computer such that the motor control computer tracks the position of the carriage along the door opener rail independent of the operation of the motor.

23 Claims, 17 Drawing Sheets

Related U.S. Application Data

(60) Provisional application No. 61/774,540, filed on Mar. 7, 2013, provisional application No. 61/890,862, filed on Oct. 14, 2013.

(51) Int. Cl.
  *B60J 5/12* (2006.01)
  *B62D 33/027* (2006.01)
  *B60J 5/14* (2006.01)

(56) References Cited

U.S. PATENT DOCUMENTS

| | | |
|---|---|---|
| 3,853,167 A | 12/1974 | Wardlaw |
| 4,597,428 A | 7/1986 | Iha |
| 4,638,433 A | 1/1987 | Schindler |
| 4,653,565 A | 3/1987 | Iha et al. |
| 5,172,744 A | 12/1992 | Finch et al. |
| 5,222,327 A | 6/1993 | Fellows et al. |
| 5,698,073 A * | 12/1997 | Vincenzi ............ E05B 65/0021 160/188 |
| 5,738,161 A | 4/1998 | Martin |
| 5,848,634 A | 12/1998 | Will et al. |
| 5,964,270 A | 10/1999 | Kirkey et al. |
| 6,019,156 A | 2/2000 | Wagner et al. |
| 6,047,576 A | 4/2000 | Lanigan et al. |
| 6,082,433 A | 7/2000 | Vafaie et al. |
| 6,230,864 B1 | 5/2001 | Cline |
| 6,374,766 B1 | 4/2002 | Clark |
| 6,588,483 B2 | 7/2003 | Rosenberg |
| 6,788,048 B2 | 9/2004 | Hedayat et al. |
| 6,860,065 B2 | 3/2005 | Griffin et al. |
| 6,883,579 B2 | 4/2005 | Olmsted |
| 6,975,203 B2 | 12/2005 | Brookbank et al. |
| 7,327,108 B2 | 2/2008 | Mullet et al. |
| 7,375,484 B2 | 5/2008 | Murray |
| 2001/0032486 A1 | 10/2001 | Doucette |
| 2003/0127198 A1 | 7/2003 | Court et al. |
| 2003/0173040 A1 | 9/2003 | Court et al. |
| 2003/0196294 A1 | 10/2003 | Conrad |
| 2004/0012483 A1 | 1/2004 | Mays |
| 2004/0155477 A1 | 8/2004 | Lanigan et al. |
| 2005/0285553 A1 | 12/2005 | Gregori et al. |
| 2007/0000622 A1 * | 1/2007 | Reed .................... E05F 15/684 160/188 |
| 2007/0256797 A1 | 11/2007 | Orton et al. |
| 2014/0251556 A1 | 9/2014 | Orton |

* cited by examiner

AUTOMATIC DOOR OPENER FOR DELIVERY TRUCKS

RELATED APPLICATIONS

The present application is a continuation application of U.S. patent application Ser. No. 14/199,854, filed Mar. 6, 2014, which is expressly incorporated herein by reference in its entirety, and which claims the benefit of U.S. Provisional Application Ser. No. 61/774,540, filed Mar. 7, 2013, which is expressly incorporated herein by reference in its entirety, and which also claims the benefit of U.S. Provisional Application Ser. No. 61/890,862, filed Oct. 14, 2013, which is expressly incorporated herein by reference in its entirety.

THE FIELD OF THE INVENTION

The present invention relates to delivery trucks. More specifically, the present invention relates to an automatic door opener for delivery trucks.

BACKGROUND

Significant time and effort is expended in opening and closing the rear door of a delivery truck (i.e. a box truck). When a driver is delivering cargo, the driver will typically drive to a delivery location, open the cargo bay door, remove cargo from the cargo bay, close the cargo bay, and deliver the cargo. Opening and closing the cargo bay door may consume a significant amount of the driver's time. Operating the door may become particularly inconvenient when the driver is holding a package.

SUMMARY OF THE INVENTION

It is an object of the present invention to provide an improved system for opening and closing the cargo door of a delivery truck. According to one example, an automatic door opener is provided for delivery trucks. The automatic door opener may save time by opening and closing the cargo bay door of a delivery truck while the driver is not at the cargo bay door. The driver may open the door remotely as he approaches the truck and may close the door as he leaves the door. The automatic door opener may also improve the functionality of the cargo bay door. The automatic door opener may include a computer system which may allow the door to be operated automatically, such as by automatically closing the door after a predetermined time period.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

The drawings of the present application are drawn to scale to allow a person to better observe and understand the relative sizes, positions, configuration, etc. of the various structures of the present invention.

Figure 1:
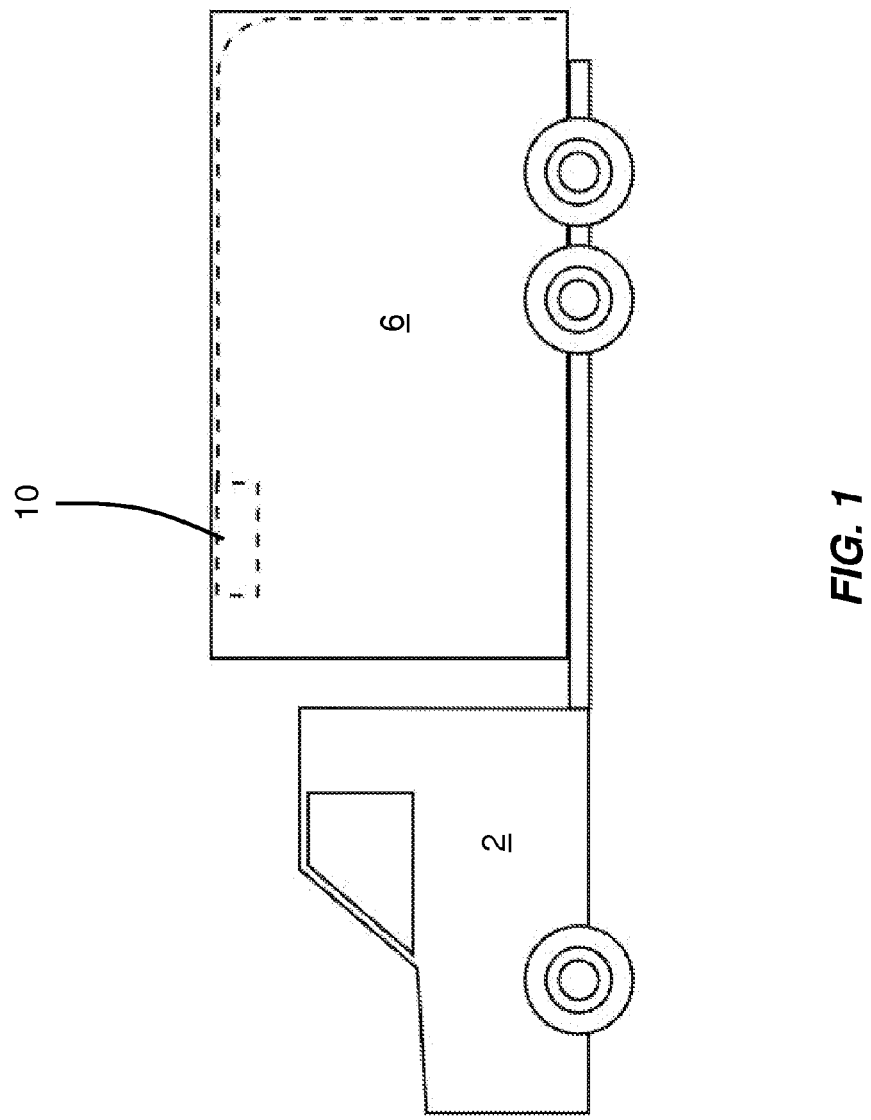
FIG. 1 shows a side view of a delivery truck.

Turning now to FIG. 1, a side view of a delivery truck with an automatic door opener for delivery trucks is shown. Portions of the cargo area of the delivery truck are shown in various figures. For clarity, not all structures of the delivery truck are shown. Exemplary delivery trucks may be a semi-truck with a tractor and trailer, a delivery truck with a truck cab and a cargo bay, etc. The delivery truck typically includes a truck cab 2 or semi-tractor with an engine, transmission, and other necessary components for moving a truck. The truck also typically includes a frame and a cargo area 6. The cargo area 6 may be the cargo bay of a delivery truck or a trailer of a semi-truck. The delivery truck cargo area 6 typically includes a floor, front wall, side walls, a ceiling, and a rear door. The rear door often opens by sliding vertically along a track which curves and extends along the roof of the cargo bay. The track thus directs the cargo bay door upwardly and then towards the front of the delivery truck along the roof of the cargo bay. The cargo bay door is typically formed of horizontally elongate sections which may bend between adjacent sections to allow the door to bend as it is opened and disposed along the roof of the cargo bay.

Figure 2:
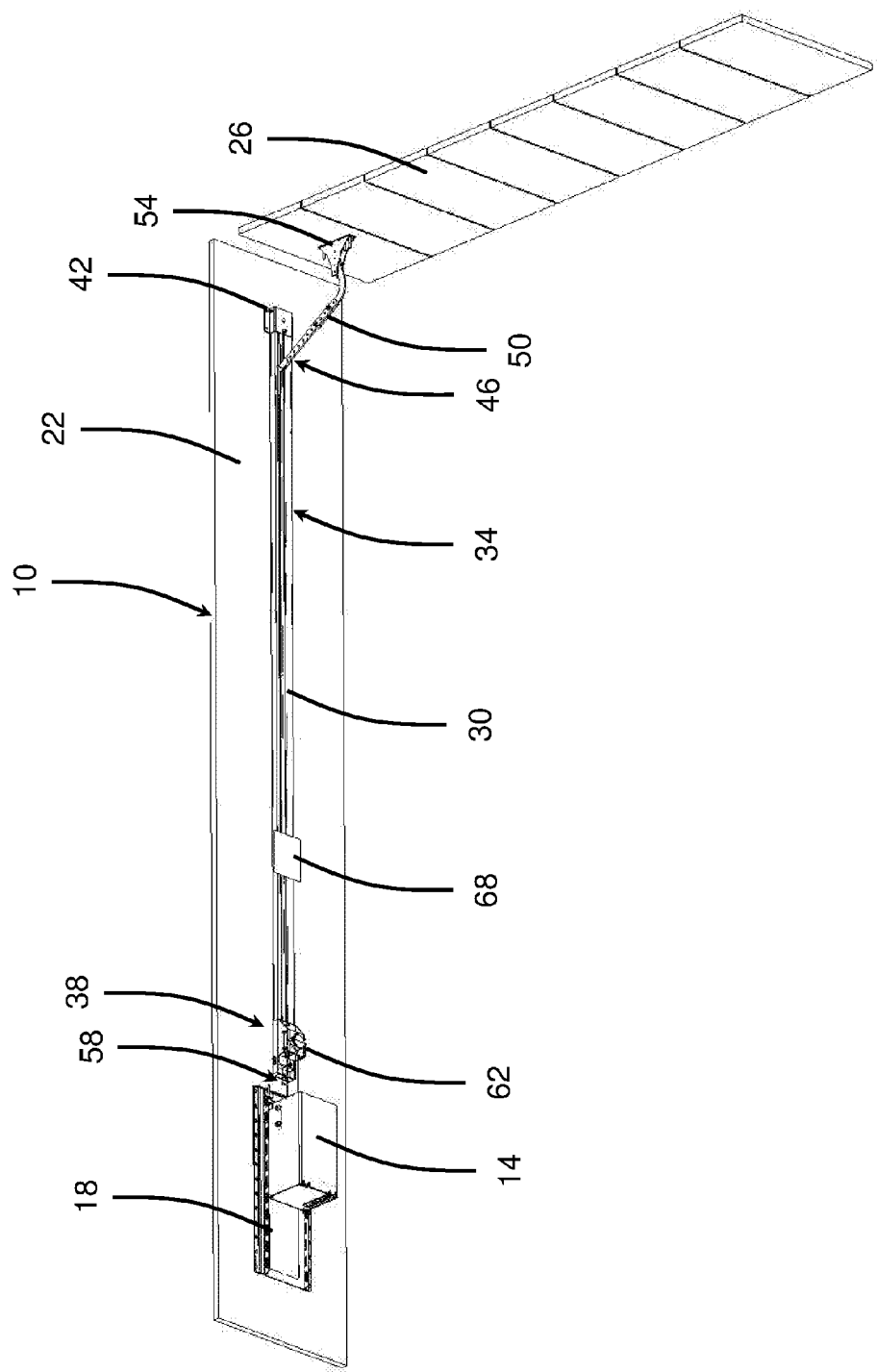
FIG. 2 shows a perspective view of an automatic door opener for delivery trucks.

Referring now to FIG. 2, the automatic door opener 10 includes a motor housing 14 which may house both a motor and an electronic motor controller/computer as well as drive transmission parts. The motor housing 14 is mounted to a horizontal mounting plate 18. The mounting plate 18 is typically attached to the roof 22 of the cargo bay of a delivery truck. The motor operates a drive mechanism to open and close the rear cargo door 26 of the delivery truck. The drive mechanism may include a door opener rail 30 which is driven by the door opener motor and which opens and closed the delivery truck cargo door. The rail may include a carriage 46 which is moved along the length of the rail 30 and which is connected to the cargo door to open and close the cargo door. The rail 30 extends between the motor housing 14 and the cargo door, and is of sufficient length to open the cargo door. The carriage 46 is moved between the motor end and the door end of the rail 30 to open and close the cargo door. The rail 30 may include a chain, belt, cable, shaft, screw, etc. to move the carriage 46. The rail 30 may include drive and driven wheels (such as pulleys or sprockets) at the motor and door ends of the rails which carry an elongate tension member (such as a chain, belt, cable). The rail 30 may include a screw which carries the carriage thereon. In one example the rail 30 houses a chain 34. The chain 34 extends around a drive sprocket 38 and an idler sprocket 42 and carries a carriage 46. The carriage 46 is attached to the door 26 by a door connector arm 50 and a door bracket 54.

The drive sprocket 38 is connected to the motor by a transmission. The motor transmission may include an intermediate chain 58 which is driven by the motor and which, in turn, drives the rail drive sprocket 38. The drive sprocket 38 is also connected to a rotational position sensor 62 which tracks the rotation of the rail drive sprocket 38 and transmits signals to a computer, allowing the computer to determine and track the position of the door 26.

Figure 3:
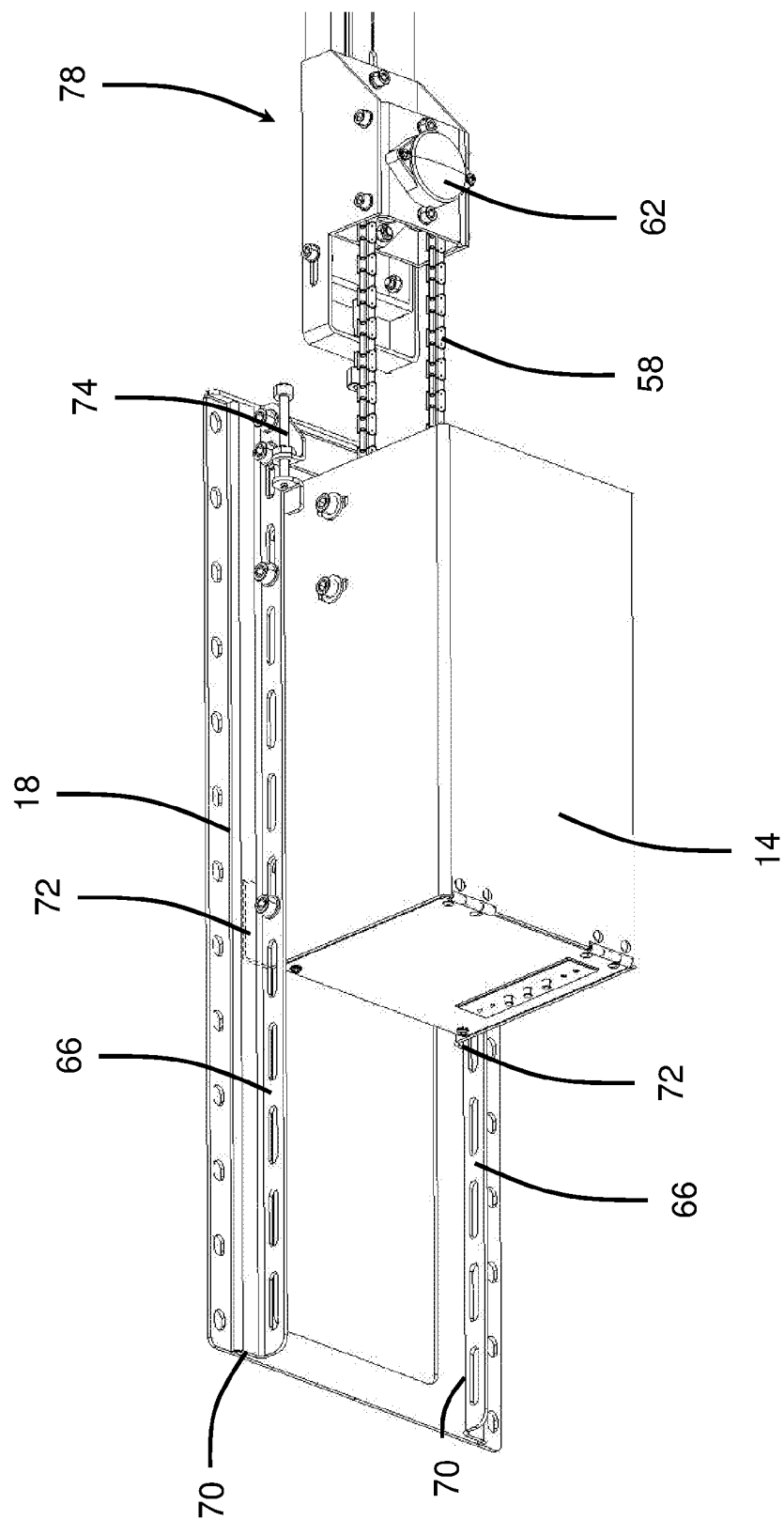
FIG. 3 shows a perspective view of the drive mechanism of the door opener.

FIG. 3 shows additional details of the motor housing 14 and the drive end of the rail 30. The mounting plate 18 includes a generally horizontal plate which is attached to the roof 22 of the cargo bay. The mounting plate 18 may include holes along the edges of the mounting plate to fasten the mounting plate to the roof 22. Two motor housing mounting flanges 66 are attached to the mounting plate 18 adjacent the lateral sides of the mounting plate 18. The motor housing mounting flanges 66 may be bent or formed such that they extend downwardly and then inwardly from the edges of the mounting plate and then again extend downwardly away from the mounting plate 18. The first downward and inward sections of the motor housing mounting flanges 66 form a horizontal channel 70 between the mounting flanges 66 and the mounting plate 18. The channels 70 extend along the length of the mounting plate 18. The top of the motor housing 14 has laterally extending flanges 72 which may be placed in the channels 70. The motor housing flanges 72 slide within the channels 70 to allow the motor housing 14 to slide forwards or backwards relative to the mounting plate 18 while being supported by the mounting plate 18. This allows the mounting plate 18 to be attached to the roof 22 of the cargo bay and the motor housing 14 to be supported within the channels 70 while the position of the motor housing 14 is adjusted to apply tension to the intermediate motor chain 58. The second downward section of the mounting flanges 66 extends adjacent the sides of the motor housing 14 and the motor housing may be fastened to the mounting flanges with bolts to fix the position of the motor housing 14. Motor chain tensioners 74 may be attached to the mounting flanges 66. The motor tensioners 74 may include a body which is bolted in a desired location on the mounting flanges 66 and a bolt or the like which is received within the body and rotated to extend the bolt to cause the bolt to push against the motor housing 14 and to move the motor housing 14 away from the rail 30 and tension the motor chain 58. The motor housing 14 is typically bolted to the mounting flanges 66 after placed in a desired position with a desired amount of tension in the motor chain 58.

Figure 4:
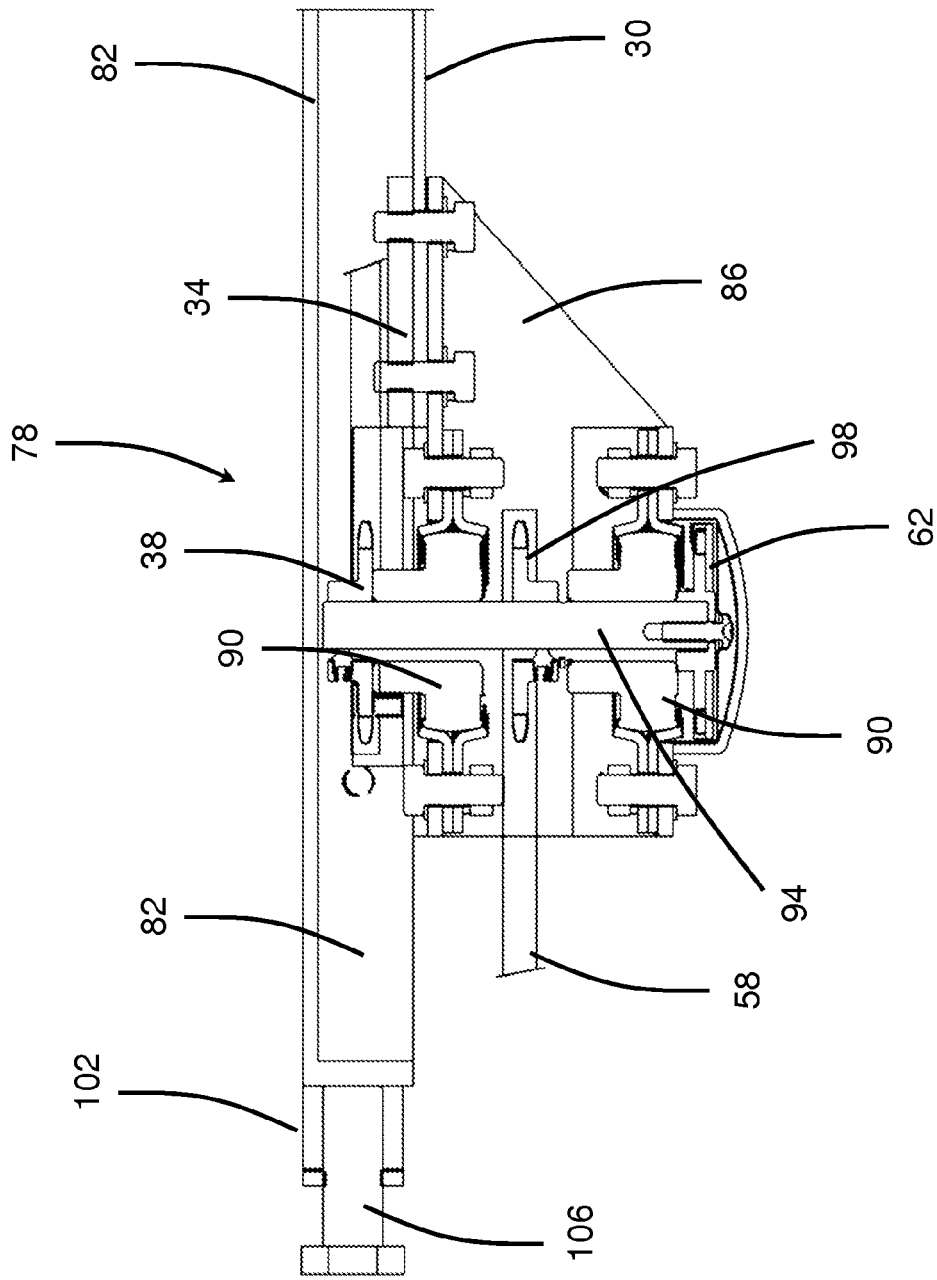
FIG. 4 shows a sectional view of the drive end of the rail.

FIG. 4 shows a schematic view of the drive end 78 of the rail 30. The drive end 78 is connected to and driven by the motor. The body of the rail 30 may be formed from an aluminum extrusion 82. A support frame 86 may be attached to the aluminum extrusion 82. The support frame 86 may be movable relative to the aluminum extrusion 82 to tension the rail chain 34. The support frame 86 may provide mounts for bearings 90 which support a shaft 94. The shaft 94 may carry the rail chain drive sprocket 38, a motor driven sprocket 98, and the sensor 62. The rail drive sprocket 38, motor driven sprocket 98, and sensor 62 are all fixed to the shaft 94 and rotate together. A rail chain tensioner 102 may include a bolt 106 which, when tightened, moves the support frame 86 away from the driven end of the rail to tighten the rail chain 34. The rail chain tensioner may press against the aluminum extrusion 82 and moves the support frame 86 away from the aluminum extrusion to tension the rail chain 34. The support frame 86 may afterwards be bolted to the aluminum extrusion 82 so that is does not move. The rail chain 34 may be tensioned during assembly and may typically not need later adjustment. The opposite door end of the rail 30 may include an idler sprocket 42 which is mounted on a shaft and bearings to support the rail chain 34.

Figure 5:
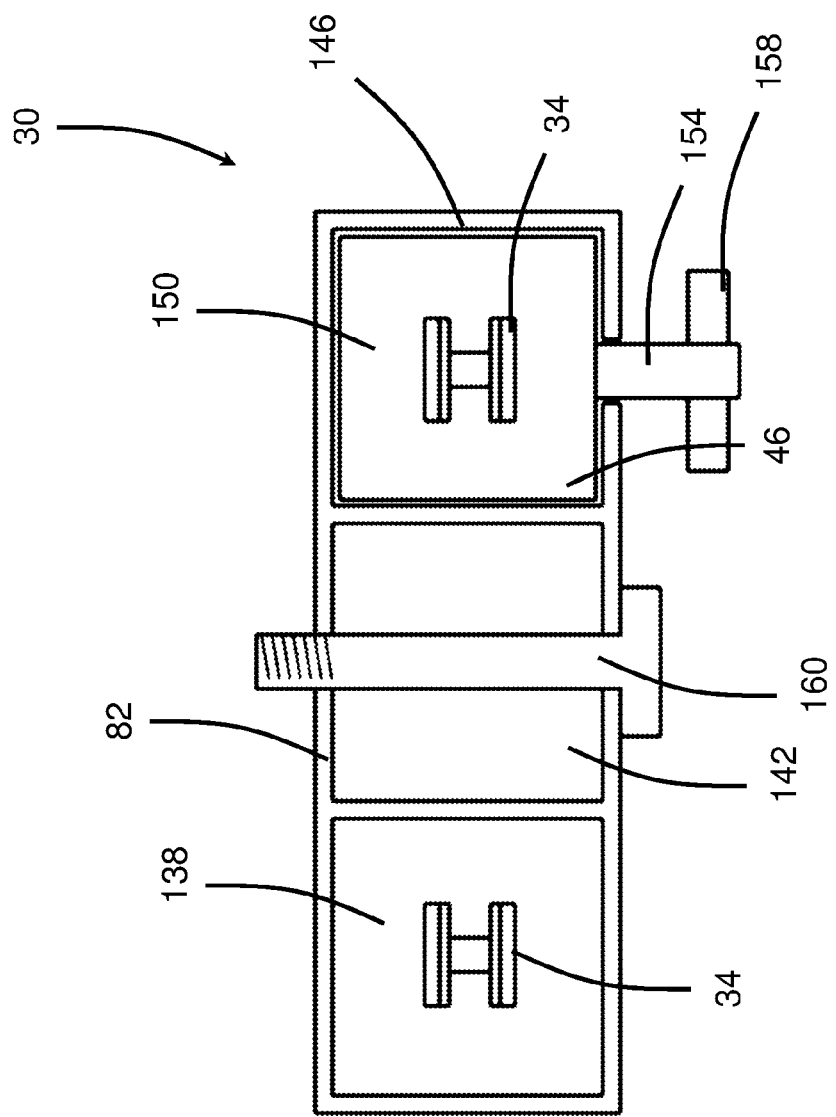
FIG. 5 shows a sectional view of the rail.
Figure 11:
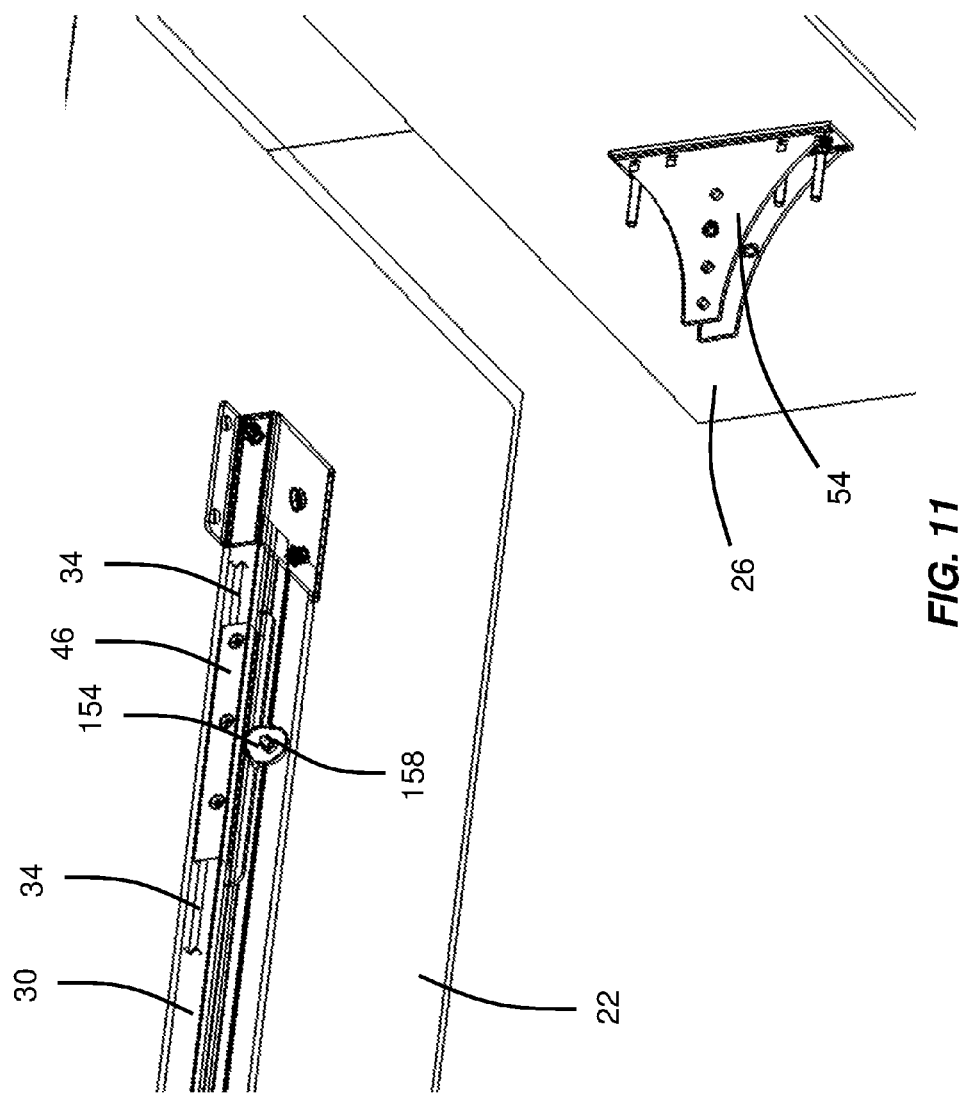
FIG. 11 shows the rail and door.

FIG. 5 shows a cross section of the rail 30. The rail 30 may be formed from an aluminum extrusion 82. The extrusion 82 may have three chambers 138, 142, 146 formed along the length of the rail 30. Two chambers, such as side chambers 138 and 146, may carry the rail chain 34. One chamber, such as side chamber 146, may carry the rail slider/carriage 46. The rail chain 34 wraps around the rail drive sprocket 38 and idler sprocket 42 (disposed at opposing ends of the rail 30), passing through one chamber 138 and another chamber 146. The two ends of the chain 34 are attached to the slider 46 (see FIG. 11) so that the chain 34 and slider 46 together form a loop with the chain 34 wrapped around the rail drive sprocket 38 and rail idler sprocket 42. The slider 46 may have a base 150 of self-lubricating plastic (such as a polyethylene/polyolefin) and a metal core which is attached to the ends of the chain 34. The slider metal core may be a metal bar which extends through the length of the slider and which has ends attached to the ends of the chain 34. The metal core of the slider, or another structure, may have an attached arm which extends from the slider/carriage 46 and holds an attachment lug 154 which attaches to the arm 50 to move the door 26. As the rail chain 34 is moved to operate the door, the slider 46 slides along the length of the rail 30 within the aluminum extrusion and opens or closes the door.

The motor assembly 14, rail 30, and motor mounting plate 18 allow for easy use and installation of the door opener 10. The rail 30 is self-contained, and may be provided with a pre-tensioned rail chain 34 such that the rail is ready to install in a delivery truck. The rail 30 is easily installed in a delivery truck. The rail 30 may be attached to the roof 22 of the cargo bay by passing bolts or screws 160 through a chamber 142 in the extrusion 82, as this chamber remains empty. Bolts may be placed at any position along this chamber 142 without any fear of disabling the rail 30. The mounting plate 18 may then be attached to the roof 22 adjacent the drive end 78 of the rail 30. The mounting plate 18 provides enough length to allow for mounting to an appropriate structure in the roof 22. The motor assembly 14 may then be secured to the mounting plate 18. The motor assembly 14 is supported by and can slide in the channels 70, allowing for easy final positioning of the motor assembly 14. The motor chain 58 may be secured around the motor drive sprocket 122 and the motor driven sprocket 98. The motor assembly 14 may then be slid away from the rail 30 to tension the motor chain 58. Tensioners 74 may be attached to the mounting flanges 66 and adjusted to tension the motor chain 58. The motor assembly 14 may then be bolted to the mounting flanges 66.

Figure 6:
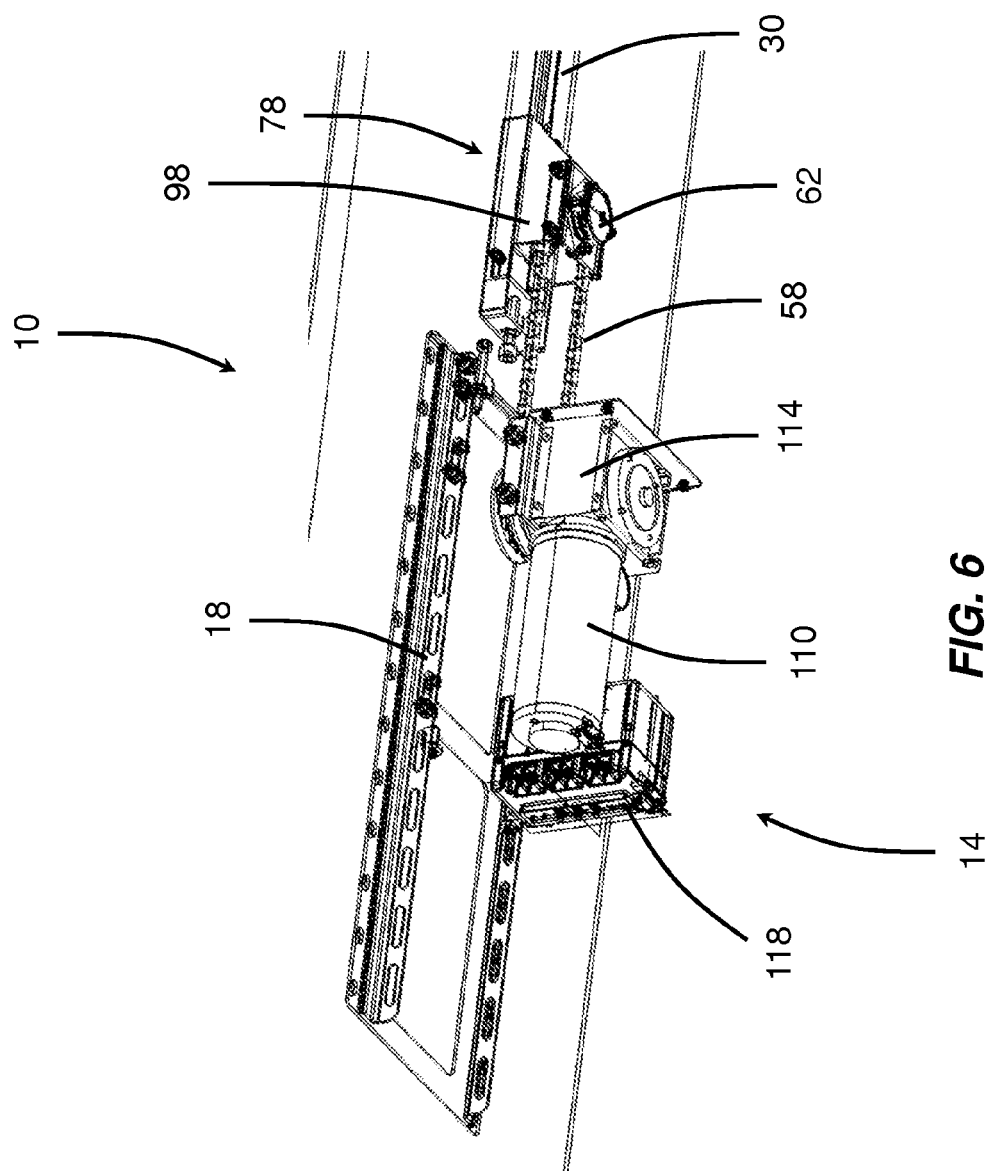
FIG. 6 shows a partially disassembled view of the door opener.
Figure 7:
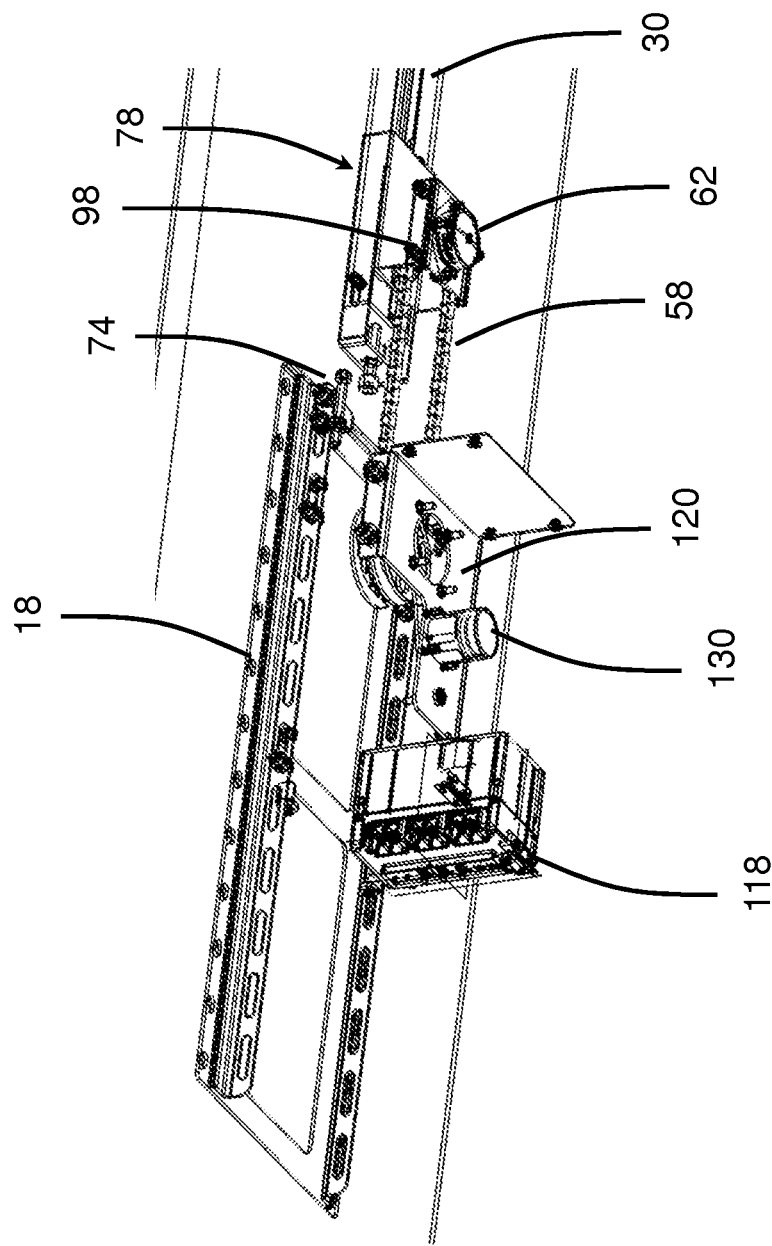
FIG. 7 shows a partially disassembled view of the door opener.
Figure 8:
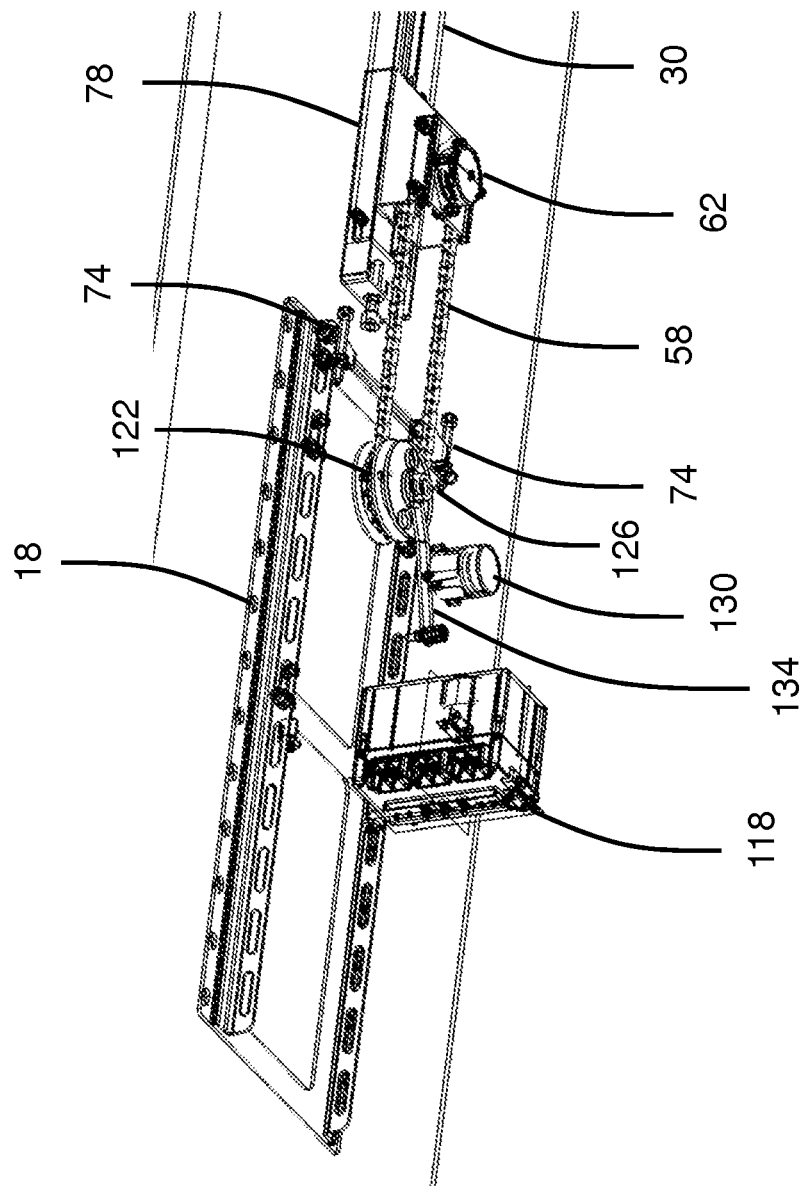
FIG. 8 shows a partially disassembled view of the door opener.
Figure 9:
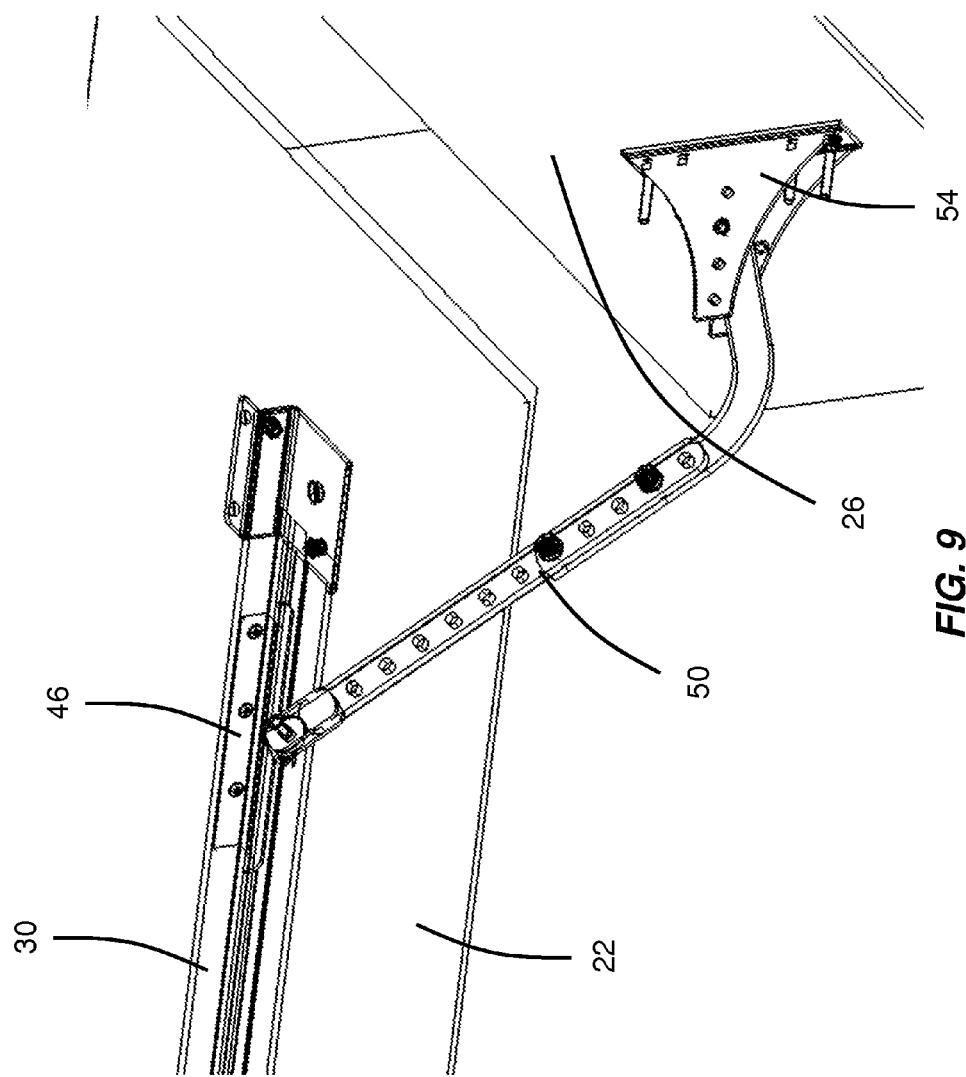
FIG. 9 shows the rail and door connection arm.
Figure 10:
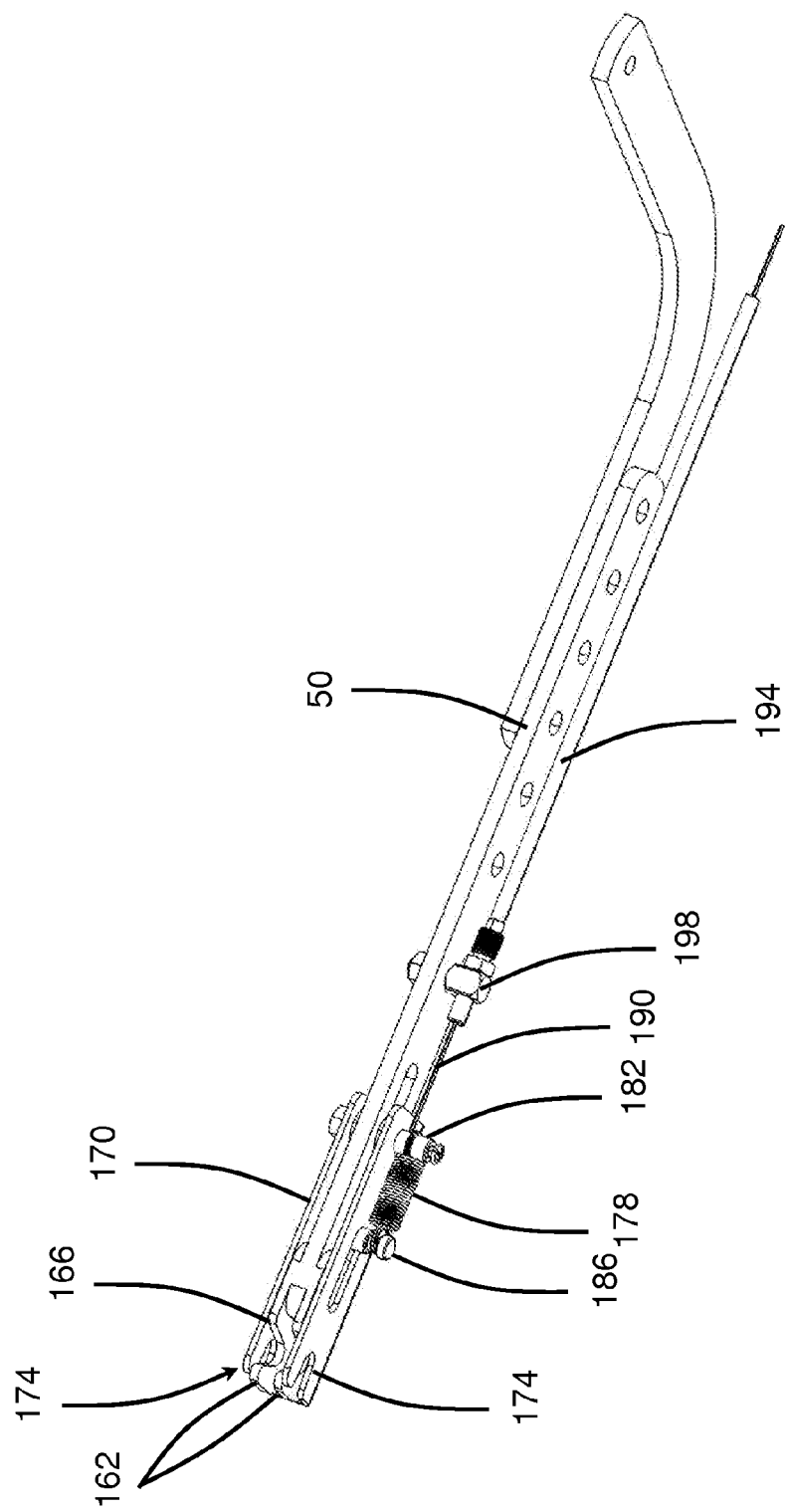
FIG. 10 shows the rail and door connection arm.

FIG. 6 shows the door opener 10 with the cover removed from the motor assembly 14. The motor assembly 14 may include a motor 110 and transmission which may include a right angle drive 114 and intermediate chain 58. The transmission provides a desired speed, torque, and output direction to drive the rail 30 and open and close the door. The motor assembly 14 may also include a computer 118. The computer 118 is connected to the power supply, motor 110 and sensor 62, and may control the operation of the door opener 10. FIG. 7 shows the door opener 10 with the motor 110 and right angle drive 114 removed. FIG. 8 shows the door opener 10 with a mounting plate 120 removed. The door opener transmission includes a motor drive sprocket 122 which is connected to the right angle drive 114 by a clutch 126. The motor drive sprocket 122 is connected to the motor driven sprocket 98 (part of the drive end of the rail 30) by the motor chain 58.

The clutch 126 may include a first round plate with holes formed in it and a second round plate with corresponding pins attached thereto. When the first plate and the second plate are pressed together, the pins engage the holes and engage the clutch. The door opener transmission may include a clutch solenoid 130 and a clutch arm 134. The solenoid 130 may be electrically operated by the computer 118 such that when voltage is applied to the solenoid, the solenoid 130 moves the clutch arm 134 and engages the first clutch plate and second clutch plate to engage the clutch 126. This allows the motor 110 to open or close the delivery truck door 26. When the computer 118 removes voltage from the solenoid 130, the clutch 126 is not engaged and the motor 110 is disconnected from the rail 30 and door.

As can be seen from FIG. 8, disengaging the clutch 126 will disengage the motor 110 from the motor drive sprocket 122. The motor drive sprocket 122, motor chain 58, and motor driven sprocket 98 remain connected to each other and to the rail 30, but are not driven by the motor 110. The rail 30, rail chain 34, rail drive sprocket 38 and sensor 62 also remain connected to each other and to the motor driven sprocket 98. With the clutch 126 disengaged, the door 26 may be moved independent of the motor. The door 26, however, remains connected to the rail 30 and moving the door 26 also moves the rail chain 34, rail drive sprocket 38, and sensor 62. The sensor 62 may thus sense movement of the door while the door is disconnected from the motor. In this manner, the computer 118 may always know the position of the door 26 even while the door is disconnected from the motor 110.

The computer 118 is connected to the motor 110 and controls the operation of the motor. The computer 118 is also connected to the sensor 62 and the sensor provides the computer with information regarding the position of the door 26. Typically, the sensor 62 may output signals indicative of the rotation of the shaft 94 and the computer may track rotations of the shaft 94 to determine the position of the door 26. By way of example, the sensor 62 may be an optical, magnetic, hall, or capacitive rotary sensor and may provide a number of different position/movement counts or signals to the computer 118 as the rail drive sprocket and sensor 62 complete a revolution. The sensor 62 may also provide absolute positioning whereby the computer knows not only incremental movement information from the sensor 62 but also knows the absolute rotational position of the sensor 62 or receives a unique signal when the sensor 62 rotates through one or more identified angular positions. The sensor 62 may thus allow the computer to accurately track/determine the position of the cargo bay door. In addition to the motor 110 and sensor 62, the computer 118 is connected to the clutch solenoid 130 and controls the operation of the solenoid. The computer 118 also includes a communications module, which typically facilitates wireless communication with a key fob or key pad to open or close the truck cargo bay door 26.

The computer 118 may be programmed by a user in many different ways. For initial setup, a user may program open and closed limits for the door 26. This may be accomplished by placing a stop (68, FIG. 2) at a desired location to block movement of the door and allowing current sense circuitry in the computer 118 to detect the open/closed positions by an increase in motor current. The computer 118 may also be programmed to control the operation of the solenoid 130 and clutch 126. The computer 118 may be programmed to energize the solenoid 130 and engage the thus clutch 126 when the motor 110 will operate.

The computer 118 may be programmed to disengage the clutch 126 after a predetermined amount of time has passed following operation of the motor 110 to open or close the door 26. For example, the computer 118 may disengage the clutch 126 a few minutes after the door has been closed. This may allow a few minutes where the motor 110 holds the door in a closed position, preventing theft while a driver is delivering a package to a customer. After a few minutes, the clutch 126 may disengage. This may be done to prevent stress and damage to the motor or drive components while the delivery truck is being driven to a subsequent delivery.

With the clutch 126 disengaged, the door 26 may bounce or move slightly during transit, or may be opened or closed manually. The computer 118, however, may always track the position of the door 26 as the sensor 62 is directly connected to the rail 30 and not to the motor 110. If a person opens the door 26 manually, the computer 118 senses the door movement just as if the motor 110 had moved the door and can immediately resume operation when desired without being reprogrammed to relearn the position of the door or the door open or closed positions.

Additionally, the computer 118 may be programmed to automatically close the door after a certain period of time. The computer 118 may be programmed to close the door 26 a short period of time after it is opened. This may allow an operator a few minutes to retrieve a package for delivery and then the computer may automatically close the door for traveling to the next delivery. The computer 118 may be programmed to close the door automatically after a longer period of time has passed, allowing an operator to leave a door open for fresh air and then close the door for security.

Referring now to FIGS. 9, 10, 11, and 12, an arm 50 is used to connect a cargo door 26 to the door opener carriage 46. The arm 50 may include a quick release attachment to the carriage 46 to allow for emergency opening of the door 26. The carriage attachment lug 154 may include a pin 158 which is attached to the lug 154 and which extends through the attachment lug 154, extending laterally from the sides of the attachment lug. The arm 50 may attach to the carriage 46 by capturing the pin 158. The arm 50 may also include a quick release mechanism to allow the arm 50 to be released from the attachment lug 154 when needed. The quick release mechanism may include a sleeve that slides over the end of the arm and is used to capture the pin 158. The carriage end of the arm 50 may be formed with two opposing side plates 162 and an opening between the two side plates 162. The side plates 162 may have a slot 166 which extends in from a side of the arm 50. The slot 166 may extend into the top side of the arm 50 into the side plates 162. The slot 166 would be located on the side of the side plates 162 which faces up when the arm 50 is installed in a truck, allowing the arm 50 to be lifted up towards the carriage 46 to capture the pin 158 in the slots 166. The slots 166 may receive the pin 158 when the arm 50 is attached to the carriage 46; allowing the carriage lug 154 to be placed between the side plates 162.

The arm 50 may also include outer side plates 170 which fit over the end of the carriage end of the arm 50; extending around the side plates 162. The outer side plates 170 are typically connected to each other and may be formed as part of a locking sleeve which may be a square sleeve, U shaped channel, etc. The outer side plates 170 may be formed with a slot 174 which extends in from the distal end of the side plates. The slots 174 are aligned with the slots 166 when the locking sleeve is disposed at the distal end of the arm 50. The side plates 170 (e.g. locking sleeve) may slide longitudinally relative to the arm 50, moving between a distal position at the end of the arm 50 and a proximal position where the outer side plates 170 are retracted away from the end of the arm 50; exposing a greater amount of the end of the arm 50. A spring 178 may be used to bias the outer side plates 170 towards the end of the arm 50. The spring 178 may be attached to the outer side plates 170 via a post 182, bolt, etc. and may be attached to the arm 50 by another post 186. The post 182 may pass through a channel in the arm 50 and assist in securing the outer side plates 170 to the arm 50 and guiding the side plates 170 (locking sleeve) as they slide longitudinally relative to the arm 50. Similarly, the post 186 may be secured to a hole in the arm 50 and may pass through a slot in the outer side plates 170 which guides the movement of the locking sleeve relative to the arm 50. The posts 182, 186 may guide the movement of the outer side plates 170 longitudinally along the arm 50 and may also capture the side plates 170 (locking sleeve) on the arm 50 and limit the movement of the side plates 170 to a desired range.

The spring 178 may bias the outer side plates 170 towards the carriage end of the arm 50. The slots 174 in the ends of the outer side plates 170 overlap the slots 166 in the side of the arm 50 when the outer side plates 170 are moved towards the end of the arm 50. This allows the pin 158 to be captured by the arm 50 as the transversely oriented slots 166, 170 engage the pin 158 and move into an overlapping orientation to capture the pin 158. A release cable 190 may be used to actuate the quick release attachment between the arm 50 and carriage 46. The cable 190 may be attached to the post 182 so that pulling on the cable 190 moves the post 182 and outer side plates 170 against the bias of the spring 178. A cable sheath 194 may be mounted to the arm 50 by a mounting lug 198. When the cable 190 is actuated, it will pull against the outer side plates 170 to move these away from the end of the arm 50. When the side plates 170 are moved away from the end of the arm 50, the pin 158 is free to move laterally out of the slots 166 and is thus released from the arm 50 so that the arm 50 is no longer connected to the carriage 46. When the cable 190 is actuated and the side plates 170 (locking sleeve) are moved out of engagement with the pin 158, the arm 50 will fall from the pin 158 by gravity and a person may then open the door 26 independent of the automatic door opener 10.

Figure 12:
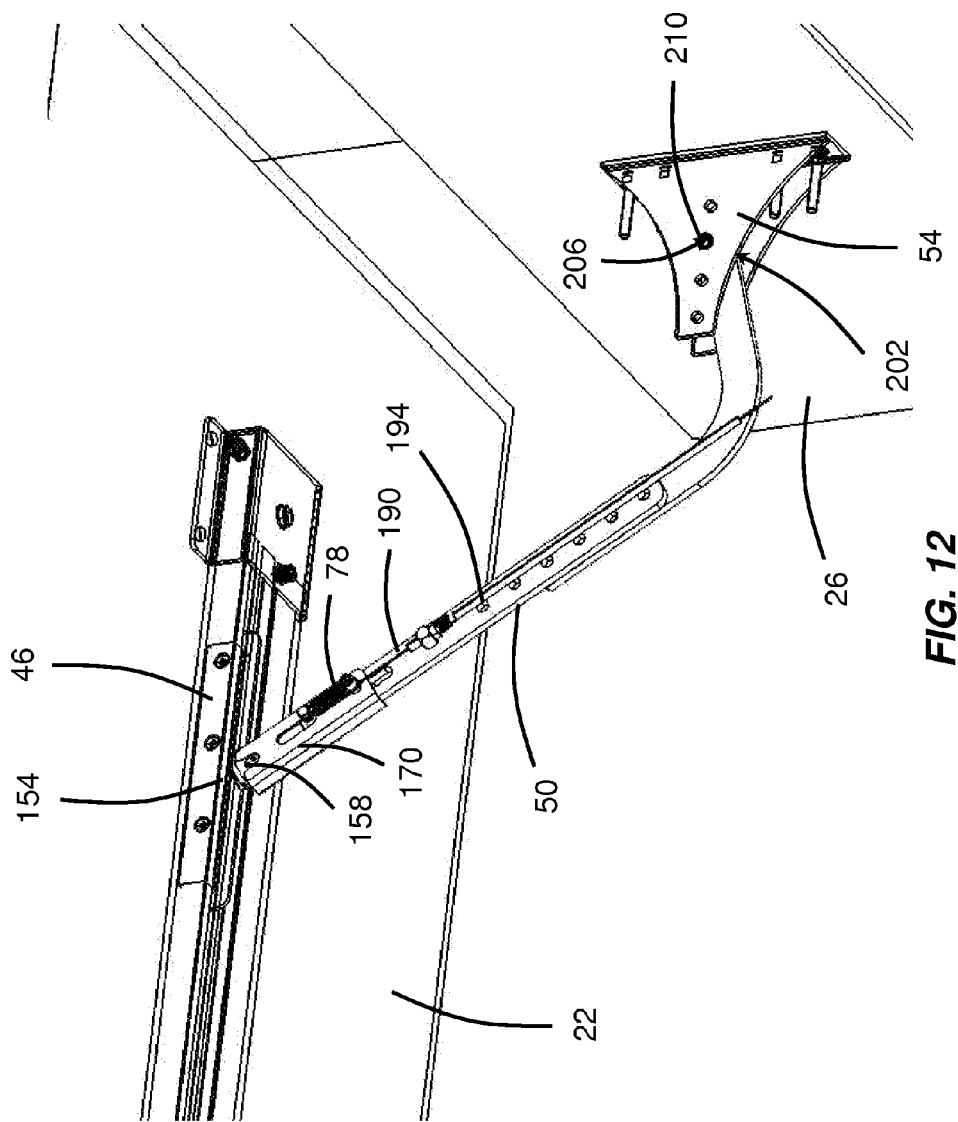
FIG. 12 shows rail, door, and door arm.

FIG. 12 shows the arm 50 attached to the carriage 46. In operation, the arm 50 remains attached to the door 26 by the door bracket 54. The door bracket 54 has a base plate or flanges which are fastened to the door 26 and includes side plates which extend outwardly from the door 26. The door bracket side plates have holes 206 which are used to secure the arm 50. The door end of the arm 50 has a hole 202 which is attached to a corresponding hole 206 in the door bracket 54 by a pin or bolt 210. The door end of the arm 50 remains attached to the door bracket 54 when a person operates the quick release attachment between the arm 50 and the carriage 46. A person may manually attach the arm 50 to the carriage 46 by manually moving the outer side plates 170 (locking sleeve) away from the carriage end of the arm 50, placing the slots 166 over the pin 158, and releasing the outer side plates 170 so that the slots 174 also engage the pin 158 in a direction which is transverse to the direction in which the slots 166 engage the pin. In this arrangement, the door 26 is secured to the carriage 46 and may be opened by the automatic door opener 10.

FIG. 12 also shows an additional view of the cargo bay door end of the rail 30. The door end of the rail 30 has an idler bracket 44 attached to the rail extrusion 82. The idler bracket 44 includes mounting provisions to hold a shaft and support the idler sprocket 42 (typically disposed underneath the idler bracket).

Figure 13:
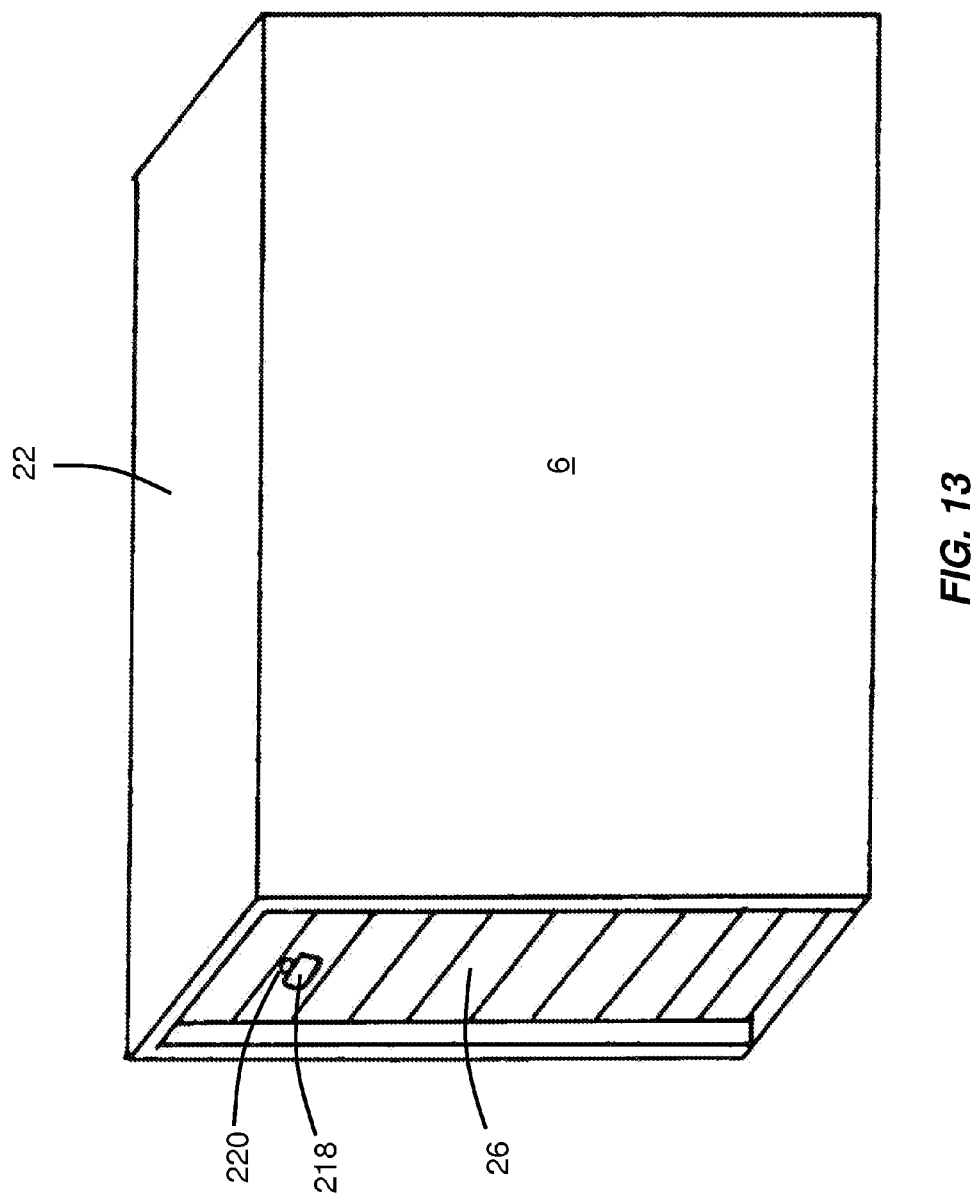
FIG. 13 shows an exterior view of a truck cargo bay according to the present invention.

Referring now to FIG. 13, a cargo bay 6 of a delivery truck (such as that discussed with respect to FIG. 1) is shown. The cargo bay 6 includes a roof 22, and door 26 as previously discussed. The cargo bay 6 is typically part of a semi-truck trailer or a delivery truck and is typically attached to a trailer frame and wheels or truck frame, wheels, and cab. The cargo bay 6 is typically pulled by a semi-tractor or a truck cab. The door 26 may include an arm release handle, lock, or lever 218. The arm release 218 is connected to the arm 50, and may be located near where the door bracket 54 attaches to the door 26. The arm release 218 is attached to the outer side plates 170 via the release cable 190 such that when the arm release 218 is actuated, the release cable 190 is also actuated, moving the outer side plates 170 away from the end of the arm 50 and releasing the pin 158. This disconnects the arm 50 from the carriage 46.

The arm 50 and arm release 218 allow a driver to access the cargo bay 6 of the delivery truck if the driver cannot operate the automatic door opener 10. This may occur if there is a power problem with the truck, the driver has lost the door opener remote, etc. For security, the release lever 218 may be secured with a lock 220, preventing access to the cargo bay by persons who are not authorized to do so. The lock 220 may prevent actuation of the release lever 218 or may disengage the release lever from the cable 190. In one configuration, the lock 220 may include a lock cylinder which may be retracted from a lock housing when unlocked. The lock cylinder 220 may be attached to the cable 190 so that a driver may unlock the lock cylinder 220 and pull outwardly on the lock cylinder 220 to pull on the cable and release the arm 50 from the carriage 46.

Figure 14:
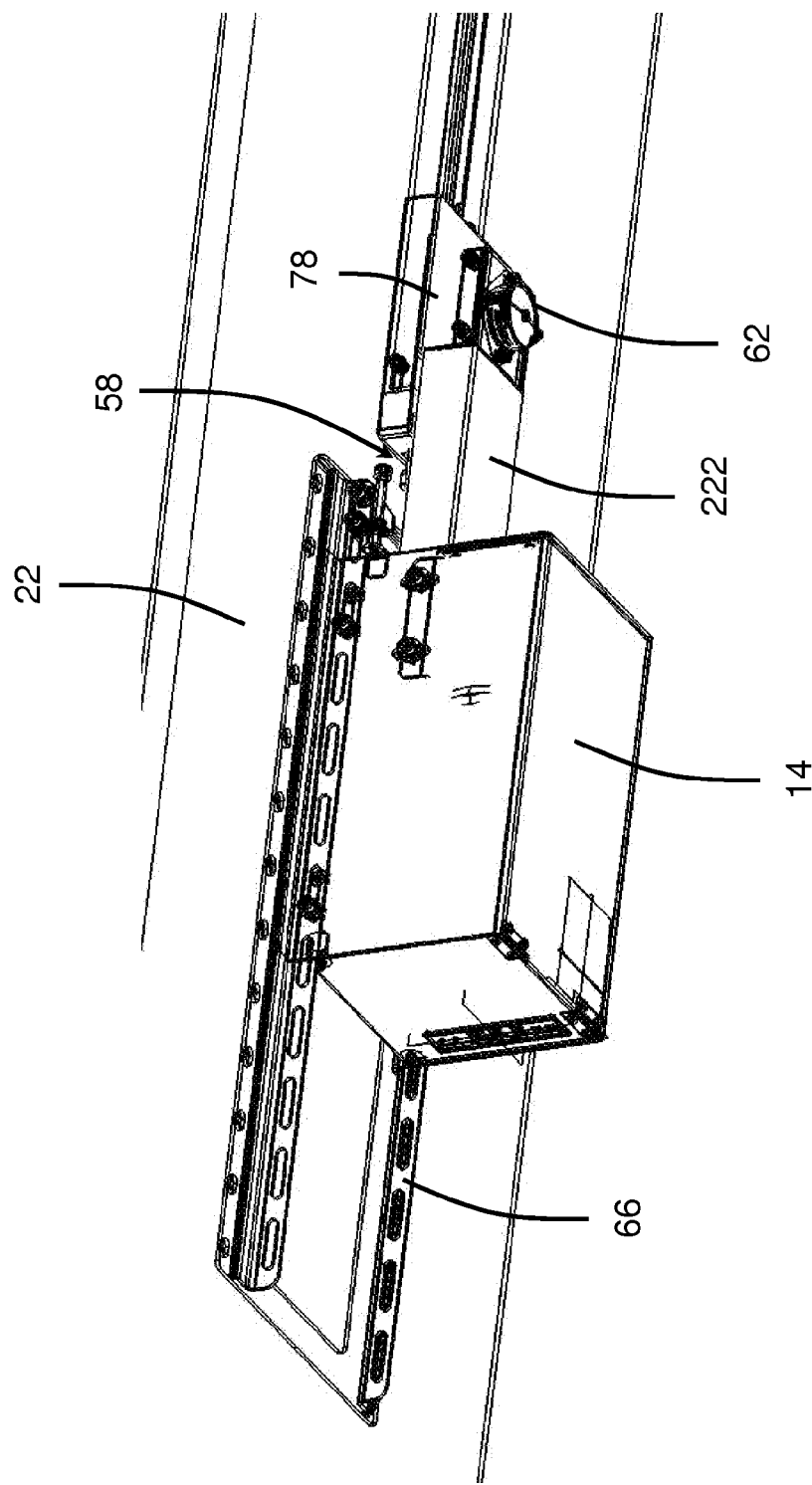
FIG. 14 shows a perspective view of the automatic door opener.

Referring now to FIG. 14, another view of the automatic door opener is shown. The automatic door opener 10 may include a chain cover 222 which extends between the motor housing 14 and the drive end 78 of the rail 30. The chain cover 222 may cover the intermediate motor chain 58 and may serve to both protect users from accidental contact with the motor chain 58 and to protect the intermediate motor chain 58 from accidental contact with items in the cargo bay 6. The chain cover 222 may also serve to contain grease or other chain lubricant and prevent any chain lubricant from being deposited on cargo in the cargo bay 6. The chain cover 222 may be attached to the frame 86 which holds the sensor 62, motor driven sprocket 98, etc. The chain cover 222 may also be attached to the motor assembly 14. The chain cover 222 may include two or more pieces which telescope to provide an adjustable length and allow for easy installation of the automatic door opener 10; with a first piece attached to the frame 86 and a second piece attached to the motor assembly 14.

Figure 15:
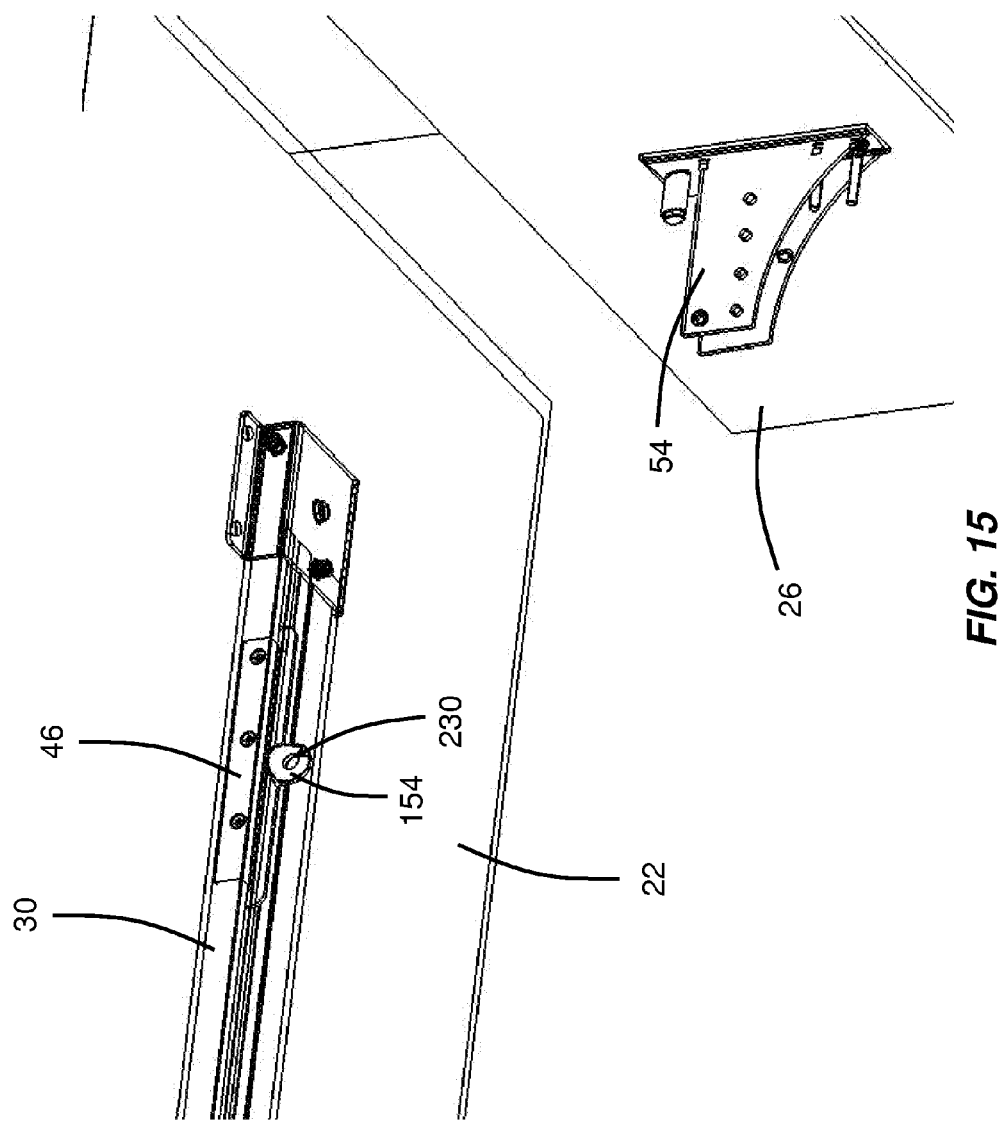
FIG. 15 shows the rail and door.
Figure 16:
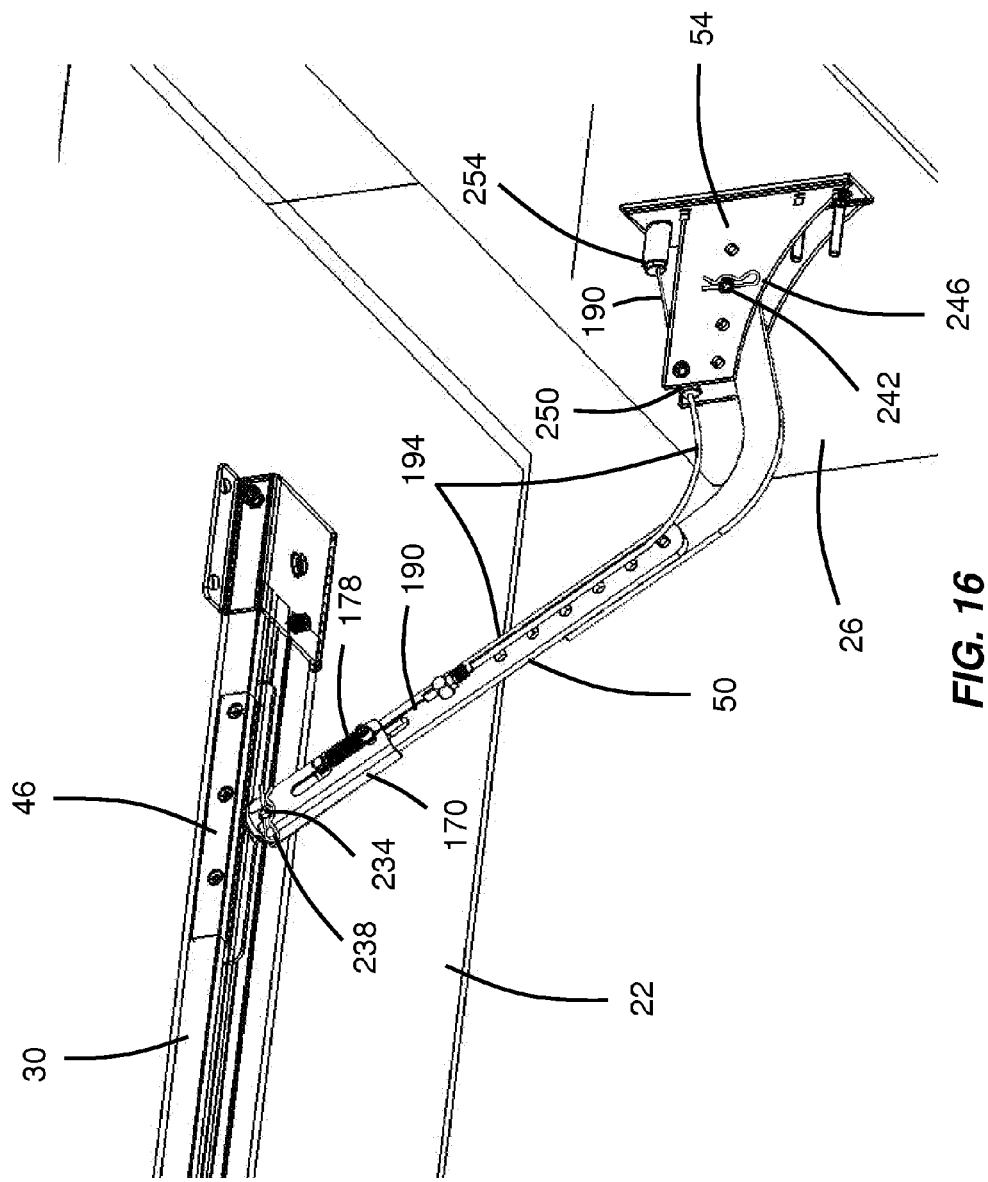
FIG. 16 shows the rail, door, and door arm.

Referring now to FIGS. 15 and 16, the door opener carriage 46 may be constructed such that the carriage attachment lug 154 includes a hole 230 which passes through the lug 154. The hole 230 may be used to secure the arm 50 to the carriage 46. The hole 230 may receive a pin 234 to secure the arm 50 to the carriage attachment lug 154. For example, a hitch pin 234 and a cotter pin 238 may be used to secure the arm 50 to the carriage attachment lug 154. A person may manually attach the arm 50 to the carriage 46 by first placing a hitch pin 234 through the hole 230 and placing a cotter pin 238 through the hitch pin 234. The person may then manually move the outer side plates 170 away from the end of the arm 50, place the slots 166 over the pin 234, and release the outer side plates 170 so that the slots 174 also engage the pin 234. Alternatively, the person may place the arm 50 in alignment over the carriage attachment lug 154 such that the hole 230, slots 166, and slots 174 are all in alignment. The person may than place a pin 234 through the hole 230, slots 166, and slots 174 and place a cotter pin 238 through the pin 234. In this arrangement, the door 26 may be opened by the automatic door opener 10.

Similarly, the arm 50 may be attached to the door bracket 54 with a hitch pin 242 and a cotter pin 248. The hitch pin would be placed through the hole 202 in the arm and the corresponding hole 206 in the door bracket 54. Typically, the door end of the arm 50 remains attached to the door bracket 54 when a person operates the quick release attachment between the arm 50 and the carriage 46. The cable sheath 194 may be mounted to the door bracket 54 by a mounting lug 250 and the cable 190 may pass through an opening 254 such as a tube, sleeve, or grommet to connect to the arm release 218, such as a lever or lock 220. When the cable 190 is actuated, it will pull against the outer side plates 170 to move these away from the end of the arm 50. When the side plates 170 are moved away from the end of the arm 50, the pin 158 is released from the arm 50 and the arm 50 is no longer connected to the carriage 46. The arm 50 will fall from the pin 158 by gravity and a person may then open the door 26 independent of the automatic door opener 10.

Figure 17:
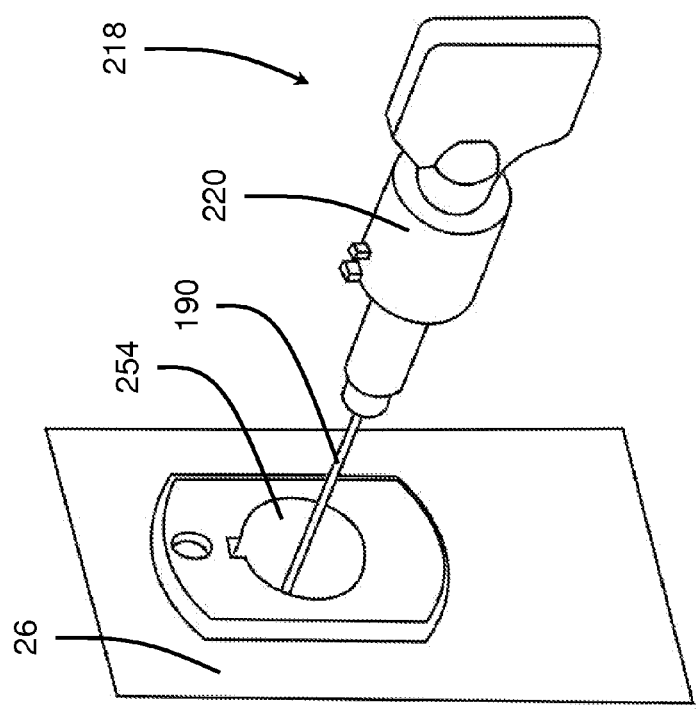
FIG. 17 shows a portion of the cargo bay door.

FIG. 17 shows a view of a portion of the outside of the cargo bay door 26. The arm release 218 may include a lock 220. In one example, the lock 220 may slide within a sleeve 254 in the door 26. The lock cylinder 220 may be connected to the cable 190 and may include external locking pins which, when the lock 220 is locked, secure the lock 220 into the sleeve 254. When the lock 220 is unlocked, the locking pins may be retracted and allow the lock 220 to be removed from the sleeve 254 or pulled and moved outwardly as shown. This motion pulls the attached cable 190 and releases the arm 50 from the rail carriage 46.

There is thus disclosed an improved automatic door opener for delivery truck cargo doors. It will be appreciated that numerous changes may be made to the present invention without departing from the scope of the claims.

What is claimed is:

1. A method of operating an automatic door opener to control operation of a door comprising:
    supporting an automatic door opener adjacent a door, the door opener comprising:
        a door opener motor which is operable to open and close a door;
        a motor control computer connected to the door opener motor to operate the door opener motor;
        a drive mechanism which connects the door opener to the door, the drive mechanism having an input which is driven by the door opener motor and an output which selectively opens and closes the door;
        a sensor connected to the drive mechanism and to the motor control computer such that the motor control computer determines the position of the door from the sensor; and
        a clutch which disconnects the door opener motor from the drive mechanism such that the door opener motor is disconnected from the drive mechanism while the sensor remains connected to the drive mechanism and wherein the method comprises the computer tracking movement of the door via the sensor when the motor is disconnected from the drive mechanism via the clutch;
    programming a stop location for opening or closing the door in the motor control computer by;
        placing a stop at a desired location to block movement of the door;
        operating the door so that the movement of the door is stopped by the stop;
        the motor control computer detecting an increase in motor current at the stop location; and
        the motor control computer identifying the stop location from the sensor.

2. The automatic door opener of claim 1, wherein the drive mechanism includes a drive sprocket connected to the clutch, a driven sprocket, and a chain connecting the drive sprocket and the driven sprocket, and wherein the sensor is connected to one of said sprockets.

3. The automatic door opener of claim 1, wherein the drive mechanism includes an input which is mechanically connected to the clutch and an output mechanically connected to the door such that operation of the motor selectively opens and closes the door.

4. The automatic door opener of claim 1, wherein the drive mechanism comprises an elongate door opener rail having a motor end disposed adjacent the door opener motor and a door end disposed away from the door opener motor and having a carriage which is movable between the motor end and the door end of the rail, and a door connector arm which connects the rail carriage to the door.

5. The automatic door opener of claim 4, wherein the door opener motor and the door connector arm may be disconnected from the door opener rail and wherein the computer tracks a position of the rail carriage on the door opener rail independently of connection of the door opener motor and the door connector arm.

6. The automatic door opener of claim 4, wherein the door connector arm comprises a quick release connection comprising a locking sleeve disposed around a rail end of the door connector arm, wherein the locking sleeve moves relative to the door connector arm, and wherein the door connector arm and the locking sleeve have transversely oriented slots which overlap each other to capture a pin on the rail carriage to attach the door connector arm to the rail carriage.

7. The automatic door opener of claim 1, wherein the clutch is actuated by the computer.

8. An automatic door opener comprising:
    a door opener motor which is operable to open and close a door;
    a motor control computer connected to the door opener motor to operate the door opener motor;
    a drive mechanism which connects the door opener to the door, the drive mechanism having an input which is driven by the door opener motor and an output which selectively opens and closes the door;
a motor housing supporting the door opener motor; and
a mounting plate, a fastener which attaches the motor housing to the mounting plate to secure the motor housing to the mounting plate to prevent relative motion between the motor housing and the mounting plate after fastening, wherein the fastener allows a fastening position of the motor housing to be varied longitudinally along the mounting plate, wherein the mounting plate defines a longitudinal channel which receives a flange which extends from the motor housing, wherein the longitudinal channel and the flange support the weight of the motor housing independent of the fastener while allowing the motor housing to slide longitudinally along the mounting plate towards and away from the drive mechanism to change a distance between the motor and the drive mechanism.

9. The automatic door opener of claim 8, wherein the mounting plate comprises two longitudinal channels and wherein the motor housing comprises two flanges which extend laterally from the motor housing and which are received in the two longitudinal channels to slide towards and away from the door opener rail to change a distance between the motor and the door opener rail.

10. An automatic door opener comprising:
a door opener motor which is operable to open and close a door;
a motor control computer connected to the door opener motor to operate the door opener motor;
an elongate door opener rail, the door opener rail having a motor end disposed adjacent the door opener motor and a door end disposed away from the door opener motor and having a carriage which is movable between the motor end and the door end of the rail, the door opener rail comprising a rail chain and three chambers, wherein the rail chain passes through two chambers.

11. The automatic door opener of claim 10, wherein one chamber has fasteners passing therethrough to attach the door opener rail to the roof of a cargo bay.

12. The automatic door opener of claim 10, wherein the door opener rail comprises a rail carriage movable between the motor end and the door end and a door connector arm connected to the rail carriage via a quick release connection, the quick release connection comprising a locking sleeve disposed around a rail end of the door connector arm, wherein the locking sleeve moves relative to the door connector arm, and wherein the door connector arm and the locking sleeve have transversely oriented slots which overlap each other to capture a pin on the rail carriage to attach the door connector arm to the rail carriage.

13. The automatic door opener of claim 10, wherein the door opener rail includes a rail drive sprocket mounted to the motor end of the door opener rail and a rail idler sprocket mounted to the door end of the door opener rail and wherein the chain wraps around the rail drive sprocket and the rail idler sprocket and connects to the rail carriage, and further comprising a sensor which is connected to the computer and which is attached to the rail drive sprocket to sense the rotation of the drive sprocket.

14. The automatic door opener of claim 13, further comprising an intermediate chain driven by the door opener motor and a motor driven sprocket which is driven by the intermediate chain, and wherein the rail drive sprocket, motor driven sprocket, and sensor are mounted to a common shaft.

15. The automatic door opener of claim 10, wherein the door opener rail comprises:
an elongate rail body having multiple chambers formed along the length thereof;
a drive wheel disposed at the motor end of the door opener rail;
an idler wheel disposed at the door end of the door opener rail;
wherein the rail chain is disposed around the drive wheel and the driven wheel;
wherein the rail chain passes through a first chamber in the elongate rail body and a second chamber in the elongate rail body;
wherein a chamber in the elongate rail body carries the rail carriage; and
wherein the rail chain is attached to the rail carriage.

16. The automatic door opener of claim 15, wherein fasteners are passed through the elongate rail body to fasten the door opener rail to an object to support the rail.

17. The automatic door opener of claim 10, further comprising:
a sensor mechanically connected to the door opener rail and electrically connected to the motor control computer such that the motor control computer determines the position of the carriage from the sensor; and
a clutch which disconnects the door opener motor from the door opener rail such that the door opener motor is disconnected from the door opener rail while the sensor remains connected to the drive mechanism.

18. The automatic door opener of claim 17, wherein the clutch is actuated by the motor control computer.

19. The automatic door opener of claim 17, wherein the door opener rail includes a drive sprocket connected to the clutch, a driven sprocket, and wherein the rail chain is connected to the drive sprocket and the driven sprocket, and wherein the sensor is connected to one of said sprockets.

20. The automatic door opener of claim 17, wherein the carriage is connected to a door, and wherein the computer tracks movement of the door via the sensor when the motor is disconnected from the drive mechanism via the clutch.

21. A method for operating an automatic door opener to control operation of a door comprising:
supporting an automatic door opener adjacent a door, the door opener comprising:
a door opener motor which is operable to open and close the door;
a motor control computer connected to the door opener motor to operate the door opener motor;
a mechanical drive mechanism which connects the door opener to the door, the drive mechanism having an input which is driven by the door opener motor and an output which moves the door to selectively open and close the door; and
a clutch which is operated by the motor control computer to selectively disconnect the door opener motor from the drive mechanism;
the computer operating the door opener to open or close the door in response to a user input to open or close the door; and
the computer automatically disengaging the clutch after a predetermined time period after receiving a signal to open or close the door and in response to the signal to open or close the door to allow the door to move independent of operation of the door opener motor.

22. The method of claim 21, wherein the method more specifically comprises:

removing an electrical voltage from the clutch to disengage.

23. A method for operating an automatic door opener to control operation of a door comprising:
- supporting an automatic door opener adjacent a door, the door opener comprising:
  - a door opener motor which is operable to open and close the door;
  - a motor control computer connected to the door opener motor to operate the door opener motor;
  - a mechanical drive mechanism which connects the door opener to the door, the drive mechanism having an input which is driven by the door opener motor and an output which moves the door to selectively open and close the door; and
  - a clutch which is operated by the motor control computer to selectively disconnect the door opener motor from the drive mechanism;
- the computer maintaining the clutch in a disengaged configuration to disconnect the door opener motor from the drive mechanism and thereby disconnect the door from the door opener motor; and
- the computer temporarily engaging the clutch for a predetermined period of time to open or close the door in response to a user signal to operate the door.

* * * * *